E. B. GILDERSLEEVE.
Can-Openers.

No. 147,931.  Patented Feb. 24, 1874.

Witnesses.

Inventor:
Ezra B. Gildersleeve
By Cox and Co.
Attys.

UNITED STATES PATENT OFFICE.

EZRA B. GILDERSLEEVE, OF NEW YORK, ASSIGNOR OF ONE-HALF HIS RIGHT TO JAMES E. GILDERSLEEVE, OF BROOKHAVEN, N. Y.

IMPROVEMENT IN CAN-OPENERS.

Specification forming part of Letters Patent No. 147,931, dated February 24, 1874; application filed January 26, 1874.

*To all whom it may concern:*

Be it known that I, EZRA B. GILDERSLEEVE, of New York city, New York, have invented certain new and useful Improvements in Can-Openers, of which the following is a specification, reference being had to the accompanying drawings.

The invention relates to a device for opening cans; and consists of a handle raised above and secured at each end to a slotted bar, in which is secured an adjustable spike, an adjustable double pointed and edged cutter or knife being placed near the extremity of the bar, and all so arranged that, the knife and spike being inserted, a section may be removed from the can equal in diameter to twice the distance between the spike and knife, by a single revolution of the handle. The object of the invention is to provide a convenient implement for opening cans and analogous purposes.

Figure 1:
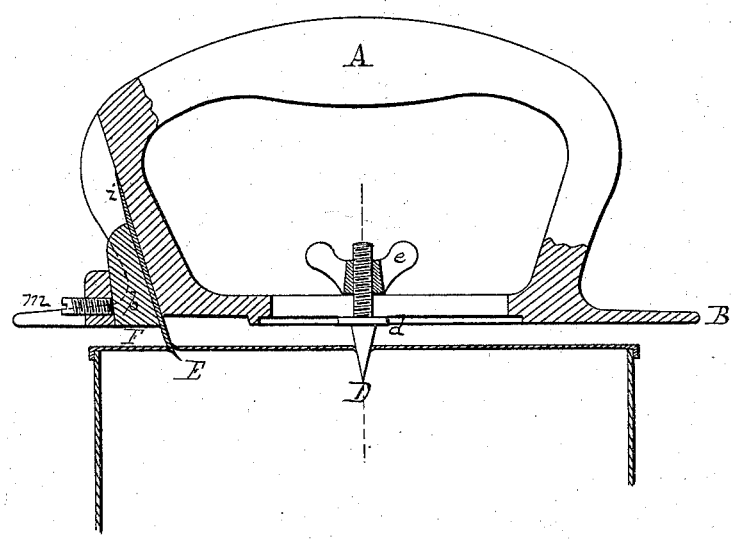
Figure 2:
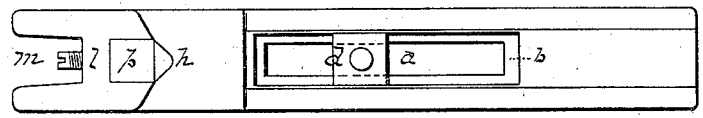
Figure 3:
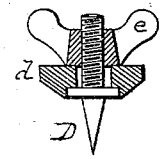

Figure 1 is a side elevation of a device embodying my invention. Fig. 2 is a bottom view of the same. Fig. 3 is a view of certain parts.

A in the accompanying drawings is a handle, raised above and secured at each side to the bar B. Preferably the handle and bar are formed in one piece of material. The bar B extends beyond the sides of the handle, and is provided with the longitudinal central slot $a$, having the recess $b$ on its lower edge, wherein fits the square or angular nut $d$ of the spike D, which projects vertically downward from the nut, its upper portion passing through the slot $a$, and provided with a thread upon which operates the set-screw $e$. The recess $b$ is of such dimensions that, when the set-screw $e$ is brought to place, the lower edge of the nut $d$ is flush with the adjacent surface of the bar B, the edges of which may be rounded to diminish friction. The bar B is recessed on one side, as shown, to give the knife E a proper bearing. Beyond this recess the surface of the bar is carried downward, forming a platform, F, in which is cut an angular aperture, $h$, prolonged into the incline slot $i$, which extends upward and outward on the outer surface of the handle, so as to give the knife E a proper support and inclination toward the spike D. The knife E is double-pointed and double-edged about its points, each end being formed on reverse sides, with a pointed edge flat upon one and curved on the other side, the width of the knife being such that it fits snugly between the sides of the slot $i$, and when in operative position, one point extends below the lower surface of the platform F, and inclines toward the axis of the vertical center of the spike D. If desired, one or both points of the knife E may be curved at the point, so as to assist in holding to the surface operated upon. The sides of the platform F are connected by the bridge $l$, a recess being cut in the end of the platform to permit the set-screw $m$ to be operated through the bridge in a threaded aperture, and upon the chock $p$ to hold or release it. The chock $p$ fits accurately in the aperture $h$, is wedge-shaped, and when in position holding the knife E, its lower surface is flush with that of the platform F.

The size of the aperture to be made being determined, the can is set in a proper position, the knife being properly extended, and the spike D adjusted, so that the distance between it and the knife E is equal to one-half the diameter of the desired opening. The spike D is now placed at or near the center of the can, and by a sharp blow driven through the metal, a like blow effects the insertion of the knife, when the handle A is grasped, the device forced downward and revolved, which removes or dissevers a circular section of the material of the can, and permits its contents to be removed, the curved point of the knife E assisting to maintain the position of the knife against the material. It is obvious that a knife set at right angles to the bar B may be employed. The straight edge of the knife may be usefully employed in cutting circular sections of cloth, leather, and similar fabrics.

What I claim as my invention, and desire to secure by Letters Patent, is—

The bowed handle A, in combination with the bar B, adjustable spike D, and knife E, substantially as shown and described.

In testimony that I claim the foregoing improvements in can-openers, as above described, I have hereunto set my hand and seal this 19th day of January, 1874.

EZRA B. GILDERSLEEVE. [L. S.]

Witnesses:
    HENRY A. TUMBLETON,
    EDWARD SELLECK.